US006856258B2

(12) United States Patent
Kirschner et al.

(10) Patent No.: US 6,856,258 B2
(45) Date of Patent: Feb. 15, 2005

(54) MESSAGE ANNOUNCEMENT SYSTEM

(75) Inventors: Mark D. Kirschner, Bethel Park, PA (US); Vincent Yungwirth, Trafford, PA (US)

(73) Assignee: Bombardier Transportation GmbH, Berlin (DE)

(*) Notice: Subject to any disclaimer, the term of this patent is extended or adjusted under 35 U.S.C. 154(b) by 44 days.

(21) Appl. No.: 10/268,920

(22) Filed: Oct. 10, 2002

(65) Prior Publication Data

US 2004/0070496 A1 Apr. 15, 2004

(51) Int. Cl.[7] ................................................ G01G 1/123

(52) U.S. Cl. .................... 340/994; 340/286.11; 381/82; 725/32

(58) Field of Search ................................ 340/994, 692, 340/286.11; 379/41, 48, 49; 381/82; 455/404.1, 404.2, 414.1; 725/32, 33, 35

(56) References Cited

U.S. PATENT DOCUMENTS

| | | | | | |
|---|---|---|---|---|---|
| 4,307,859 | A | | 12/1981 | Hayashi et al. | |
| 4,713,661 | A | | 12/1987 | Boone et al. | |
| 4,891,785 | A | | 1/1990 | Donohoo | |
| 4,949,248 | A | | 8/1990 | Caro | |
| 5,133,081 | A | * | 7/1992 | Mayo | 340/905 |
| 5,264,822 | A | * | 11/1993 | Vogelman et al. | 340/692 |
| 5,421,009 | A | | 5/1995 | Platt | |
| 5,533,695 | A | | 7/1996 | Heggestad et al. | |
| 5,724,574 | A | | 3/1998 | Stratigos et al. | |
| 5,736,940 | A | * | 4/1998 | Burgener | 340/994 |
| 5,764,900 | A | | 6/1998 | Morris et al. | |
| 5,764,908 | A | | 6/1998 | Shoji et al. | |
| 5,778,228 | A | | 7/1998 | Wei | |
| 5,793,281 | A | * | 8/1998 | Long | 340/384.1 |
| 5,832,219 | A | | 11/1998 | Pettus | |
| 5,836,529 | A | | 11/1998 | Gibbs | |
| 5,936,515 | A | * | 8/1999 | Right et al. | 340/692 |
| 6,107,936 | A | * | 8/2000 | Zimmerman | 340/5.1 |
| 6,147,593 | A | * | 11/2000 | Hall et al. | 340/286.11 |
| 6,237,039 | B1 | | 5/2001 | Perlman | |
| 6,266,706 | B1 | | 7/2001 | Brodnik et al. | |
| 6,282,575 | B1 | | 8/2001 | Lin et al. | |
| 6,286,041 | B1 | | 9/2001 | Collins, III et al. | |
| 6,286,045 | B1 | | 9/2001 | Griffiths et al. | |
| 6,374,176 | B1 | | 4/2002 | Schmier et al. | |
| 6,674,357 | B1 | * | 1/2004 | Bermel | 340/7.55 |
| 2003/0143944 | A1 | | 7/2003 | Martin et al. | |

FOREIGN PATENT DOCUMENTS

| | | |
|---|---|---|
| WO | 01/57763 | 8/2001 |

OTHER PUBLICATIONS

Search Report under Section 17 for foreign counterpart Application No. GB 0323531.4, Jan. 2004.

* cited by examiner

*Primary Examiner*—Thomas Mullen
(74) *Attorney, Agent, or Firm*—Webb Ziesenheim Logsdon Orkin & Hanson, P.C.

(57) ABSTRACT

A message announcement system for broadcasting announcements at predetermined locations has an autonomous announcement computer at each predetermined location, wherein a plurality of event announcements and associated event identifiers are stored therein and, upon receipt of an event announcement command, the announcement computer broadcasts a particular event announcement at the location. A master computer is in communication with each announcement computer for adding, deleting or editing event announcements. This arrangement permits a modular system, whereby autonomous announcement computers, along with their associated public address systems and sign systems, may be added or removed as stations are added or removed. The system is also capable of broadcasting live announcements at each location.

22 Claims, 4 Drawing Sheets

MESSAGE ANNOUNCEMENT SYSTEM

BACKGROUND OF THE INVENTION

1. Field of the Invention

This invention relates to a message announcement system for announcing necessary information about events at a station and, more particularly, to a modular message announcement system capable of accommodating the addition or removal of stations.

2. Description of Related Art

For purposes of discussion, the prior art and the details of the invention will be directed to a rail system with trains and rail stations. However, it should be appreciated that the subject invention may be applicable to other areas as well, such as announcement systems and other types of transit systems and with announcement systems for other unrelated systems, for example, announcements at attractions at amusements parks.

Directing attention to the invention as applied to a rail system, usually, when a train approaches or arrives at a station, an announcement about the approach or arrival of the train is performed at the station. Such announcements are usually transmitted in one of two ways. In one scenario, all stations have a bank of stored automated announcements that are activated by signals generated within the rail system. When it is necessary to add, delete or modify a stored announcement, the storage at each station must be manually modified. Additionally, any time a live announcement must be made at one or more stations, a separate PA system than that used to broadcast stored audio announcements or a separate sign system to broadcast live text messages is used. Therefore, in this scenario, two separate systems are required.

In an alternate scenario, both live and automated announcements are broadcast from a central location to each station. This arrangement is suitable when the system has a small number of stations, however, the complexity of such a system is unmanageable for systems having a large number of stations.

A message announcement system is desired that will not only accommodate both automatic announcements and live announcements, but will furthermore permit the addition, deletion and change of stored announcements at each station from a central location. Furthermore, a system is needed that will have the flexibility to allow the announcement system to be extended to new stations or taken away from removed stations with a minimal effort.

SUMMARY OF THE INVENTION

A message announcement system for broadcasting announcements at predetermined locations, wherein the system is comprised of:

a) an autonomous announcement computer at each predetermined location, wherein a plurality of event announcements and associated event announcement identifiers are stored therein and upon the receipt of an event announcement command, the announcement computer broadcasts a particular stored announcement at the location; and b) a master computer in communication with each announcement computer for adding, deleting or editing event announcements.

In a message announcement system for broadcasting event announcements at predetermined locations, a method for editing and broadcasting event announcement comprising the steps of:

a) storing in an autonomous announcement computer at each predetermined location, a plurality of event announcements and associated event announcement identifiers;

b) upon the receipt of an event announcement command, broadcasting a stored announcement at the predetermined location; and c) editing event announcements stored at the announcement computers using a master computer in communication with each announcement computer.

BRIEF DESCRIPTION OF THE DRAWINGS

The exact nature of the present invention will become more clearly apparent with reference to the following detailed specification taken in conjunction with the accompanying drawings in which.

DESCRIPTION OF THE INVENTION

Figure 1:
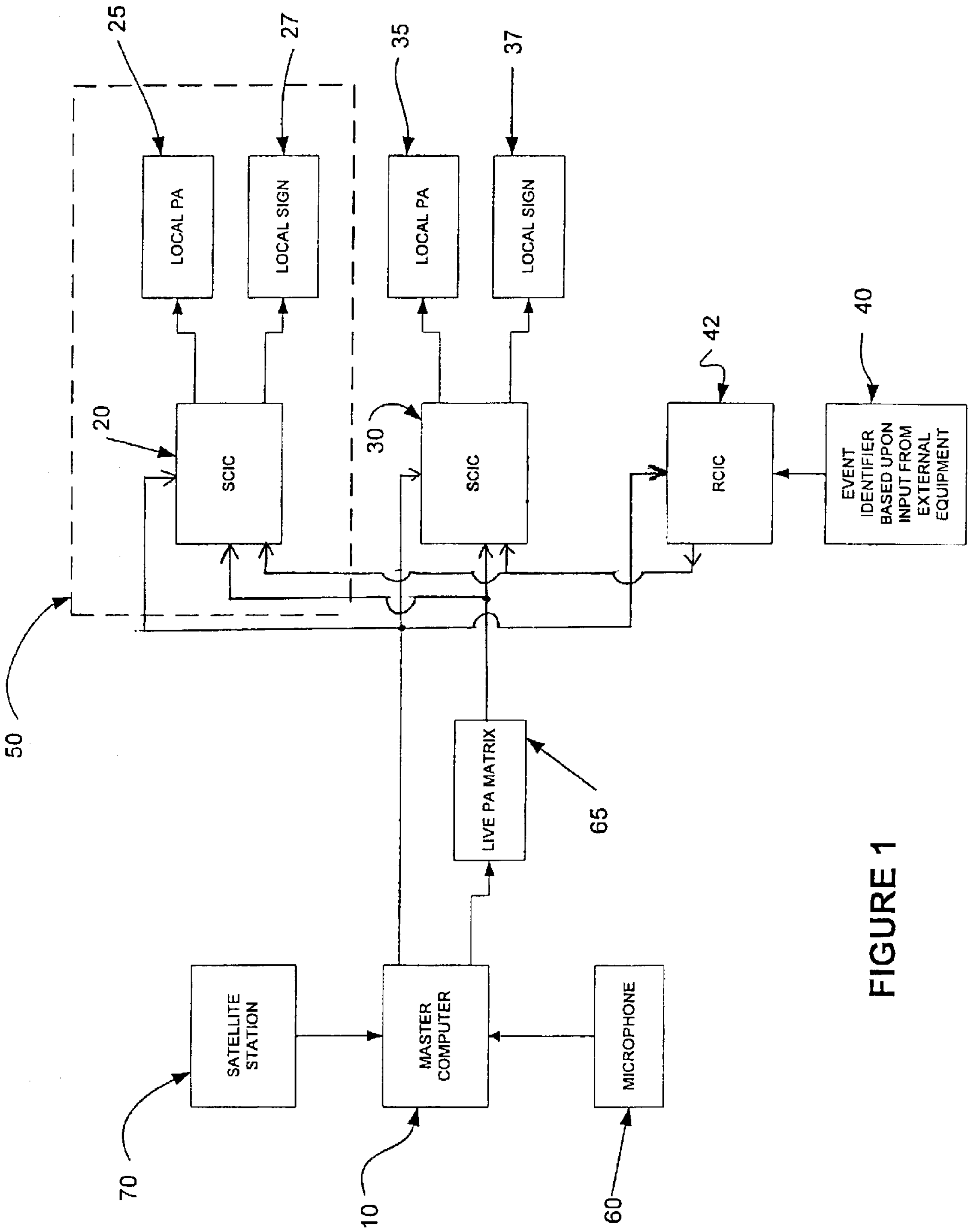
FIG. 1 illustrates a schematic of hardware associated with a first embodiment of the subject invention.

FIG. 1 illustrates an overview of the hardware associated with the message announcement system for broadcasting stored announcements at predetermined locations, such as rail stations in a rail system. Details of the actual hardware and additional electrical components are not provided with the understanding that such details are well known to one skilled in the art of communication systems.

For purposes of this discussion, the system will be comprised of only two stations at predetermined locations having a first autonomous announcement computer (SCIC) 20 at a first predetermined location and a second autonomous announcement computer (SCIC) 30 at a second predetermined location.

Event announcements may be comprised of one or both of stored audio announcements made through a public address system, or stored text announcements presented through electronic signs. As an example, when a train is arriving at a station, the audio announcement might broadcast the phrase "Train arriving. Please stand clear of the doors," while the text announcement would spell this out in a sign. The announcement may be broadcast one or more times, depending upon the circumstances.

As another example, in the event the platform doors at the station are out of service, there would be no audio announcement, but the text announcement displayed by the sign would be, for example, "Doors out-of-service. Please use adjacent doors."

In contrast, live announcements are not stored, but are transmitted live from a central location.

Each event announcement has an associated event announcement identifier also known as an event number, and the event announcement, along with the associated event announcement identifier, are stored within each autonomous announcement computer. A plurality of event announcements and associated event announcement identifiers are stored within each autonomous announcement computer and when an event announcement command including an event identifier is transmitted to an autonomous announcement computer, the particular stored event announcement is retrieved and thereafter broadcast.

As an additional feature, announcement systems generally have the capacity to broadcast event announcements in different languages where appropriate by storing the same announcement in different languages. As an example, for a people mover vehicle at an international airport, it might be necessary to broadcast event announcements in Japanese at a particular time during the day when a portion of the airport is largely populated by Japanese speaking travelers. At another time of the day, it may be desirable to broadcast event announcements in German when the airport is largely populated by German speaking travelers. As a result, with the stored announcements, both audio and textual, and with the event announcement identifiers and language schedules stored in each autonomous announcement computer, the task of deleting, adding or modifying any of this data in a plurality of announcement computers may become cumbersome to the point that modifications to an existing system are not attractive.

Directing attention to FIG. 1, the subject invention utilizes a master computer 10, that is in direct communication with each autonomous announcement computer 20, 30 for editing announcements whether they be audio or textual.

The announcement command, which includes the event announcement identifier, is generated from input provided by various external equipment 40 throughout the rail system, such as train control, intrusion detection, fire alarm, door control, passenger call and train request equipment, and forwarded to a regional distribution computer (RCIC) 42 which transmits the event announcement identifier to the appropriate autonomous computer 20, 30.

It should be appreciated that a given stored announcement may be comprised of one or both an audio announcement or a text announcement. While typically a single event has both an audio and a text announcement associated with it, in certain instances it may be desirable to transmit only one or the other of these announcements.

An important benefit of the subject invention is the ability of master computer 10 to edit the stored announcement in each of the autonomous announcement computers 20, 30. Such editing provides substantial benefits. Even though the master computer 10 must still be linked to each announcement computer 20, 30, the transfer of data required to edit event announcements may be done in a much simpler fashion than if the same announcements had to be transmitted and broadcast directly through the master computer 10. The master computer 10, in this same fashion, may add or delete stored announcements from one or more of the announcement computers 20, 30.

Directing attention to FIG. 1, reference number 50 points to a phantom outline which includes an autonomous announcement computer 20 and the associated local public address system 25 and local sign 27. It should be appreciated that the same collection of hardware is duplicated and associated with the autonomous event announcement computer 30. In particular, a local public address system 35 and local signs 37 are associated with the second autonomous computer 30. In light of this, it should be apparent that one major advantage of the subject invention is the ability to add or remove modules to the message announcement system enabling the message announcement system to be easily adapted to accommodate a rail system having few or many systems.

Each autonomous announcement computer 20, 30 has stored therein a full array of announcements in both audio and text format with associated event identifiers and, furthermore, has within its storage a schedule of the particular language in which the announcement should be made at a particular time of day. Therefore, all that is necessary to initiate an announcement at one of the stations is an event announcement command in the form of an event identifier transmitted from the external equipment within the system 40 to the distribution computer (RCIC) 42, and then to each autonomous computer 20, 30. It should be apparent that merely by transmitting an event identifier to a given autonomous computer 20, 30, not only will the appropriate message be broadcast, but such a message will be broadcast in a particular language. The case of adding or removing stations may also be appreciated since each station is independent from one another, and needs only to receive an event announcement identifier to initiate the broadcast of an announcement in a particular language. In this sense, each module 50 may be interchangeable with other modules within the system.

While in the majority of cases each autonomous computer 20, 30 will have stored therein identical announcements and identical associated announcement identifiers, under some circumstances, it may be desirable for at least one autonomous computer to have stored therein different announcements and associated announcement identifiers.

Illustrated in FIG. 1 is a single microphone 60 in direct communication with the master computer 10 for transmitting live public address announcements through a live public address matrix 65 and onto each local public address system 25, 35. It is entirely possible to include at least one additional satellite station 70 connected to the master computer 10 capable utilizing the master computer 10 to make live announcements and to edit and/or delete announcements stored within each announcement computer 20, 30.

What has been described so far is the use of the distribution computer (RCIC) 42 to transmit from external sources 40 an event identifier to each of the two autonomous announcement computers 20, 30, thereby broadcasting announcements on the local public address system 25, 35 and the local signs 27, 37 associated with each autonomous computer 20, 30.

Figure 2:
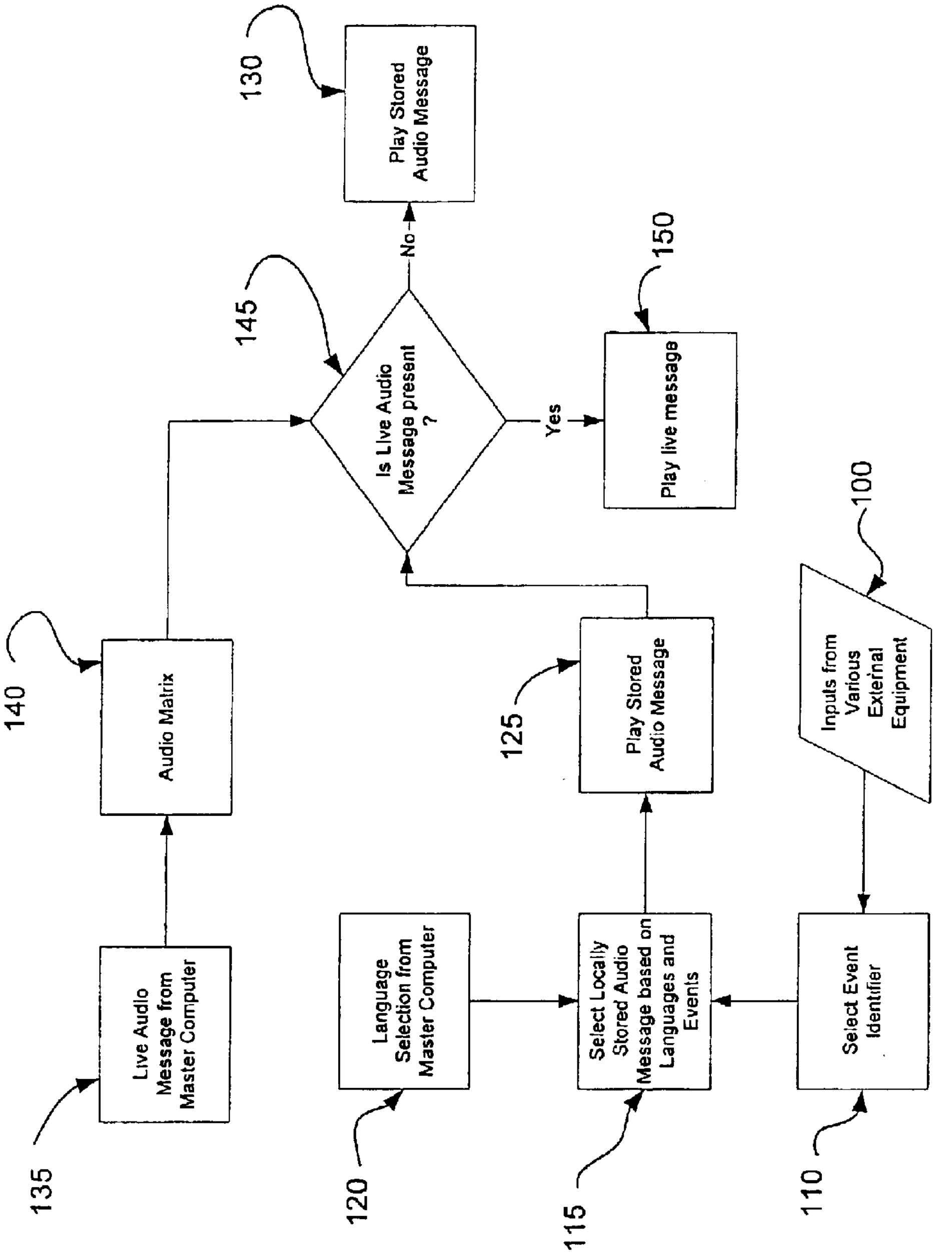
FIG. 2 is a flow chart illustrating the logic associated with the transmission of a live audio message.

FIG. 2 illustrates the logic associated with the transmission of stored and live audio messages. Input from various external equipment 100, such as train control, intrusion detection, fire alarm, door control, passenger call and train request equipment, is provided to select 110 the appropriate event identifier. The event identifier is then used to select 115 locally stored audio messages based on both the event identifier and the language associated with a given schedule 120. As previously mentioned, the schedule for languages associated with a given announcement is provided by the master computer and stored within each announcement computer. With this information, the stored audio announcement may be played 125.

In many instances, the stored audio message is played multiple times. It may be played sequentially at least twice as illustrated by reference number 125 and reference number 130. Depending upon the configuration of the system, the broadcast 150 of live audio announcements may take precedence over the broadcast of stored audio messages and, as a result, in the event a live audio announcement 135 is received from the master computer through the audio matrix 140, the module 50 (FIG. 1), upon receipt 145 of the live audio announcement, will override any stored audio message announcements and play the live announcement 150.

Figure 3:
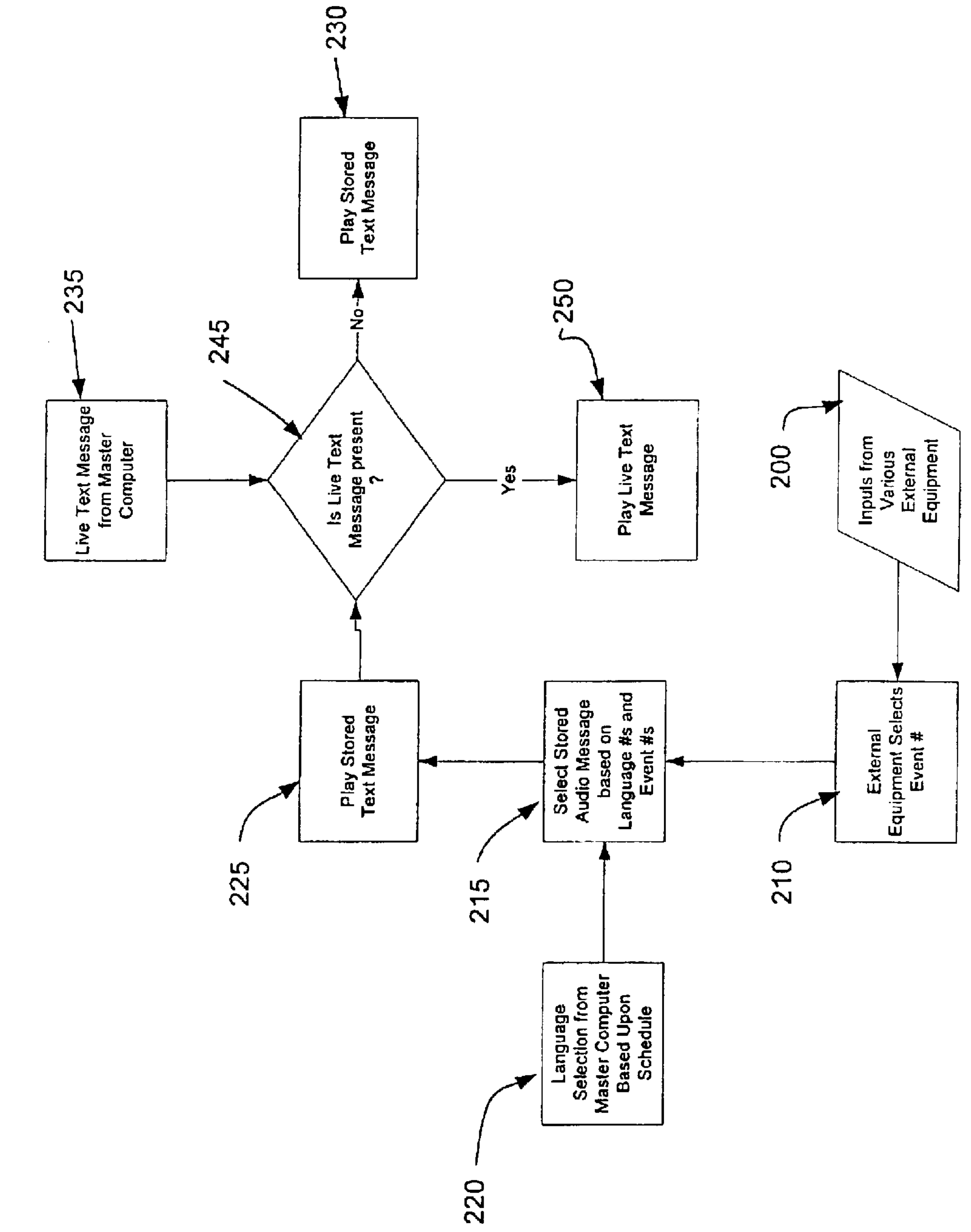
FIG. 3 is a flow chart illustrating the logic associated with transmitting live text messages throughout the system.

FIG. 3 illustrates the logic associated with the transmission of stored and live messages. Once again input from various external equipment 200, as already described in association with reference number 100 in FIG. 2, is used to select 210 an event identifier. The event identifier is forwarded to each announcement computer which selects 215 locally stored audio announcements based on the event identifier and the language of the announcement from the schedule 220. The appropriate text announcement is then broadcast. Just as with the stored audio announcements, a stored text announcement may be played repeatedly, as indicated by items 225 and 230. In the event a live text announcement from the master computer 235 is received at the announcement computer, as indicated at 245, the module 50 (FIG. 1) overrides the stored text announcement in favor of playing the live text announcement 250.

Figure 4:
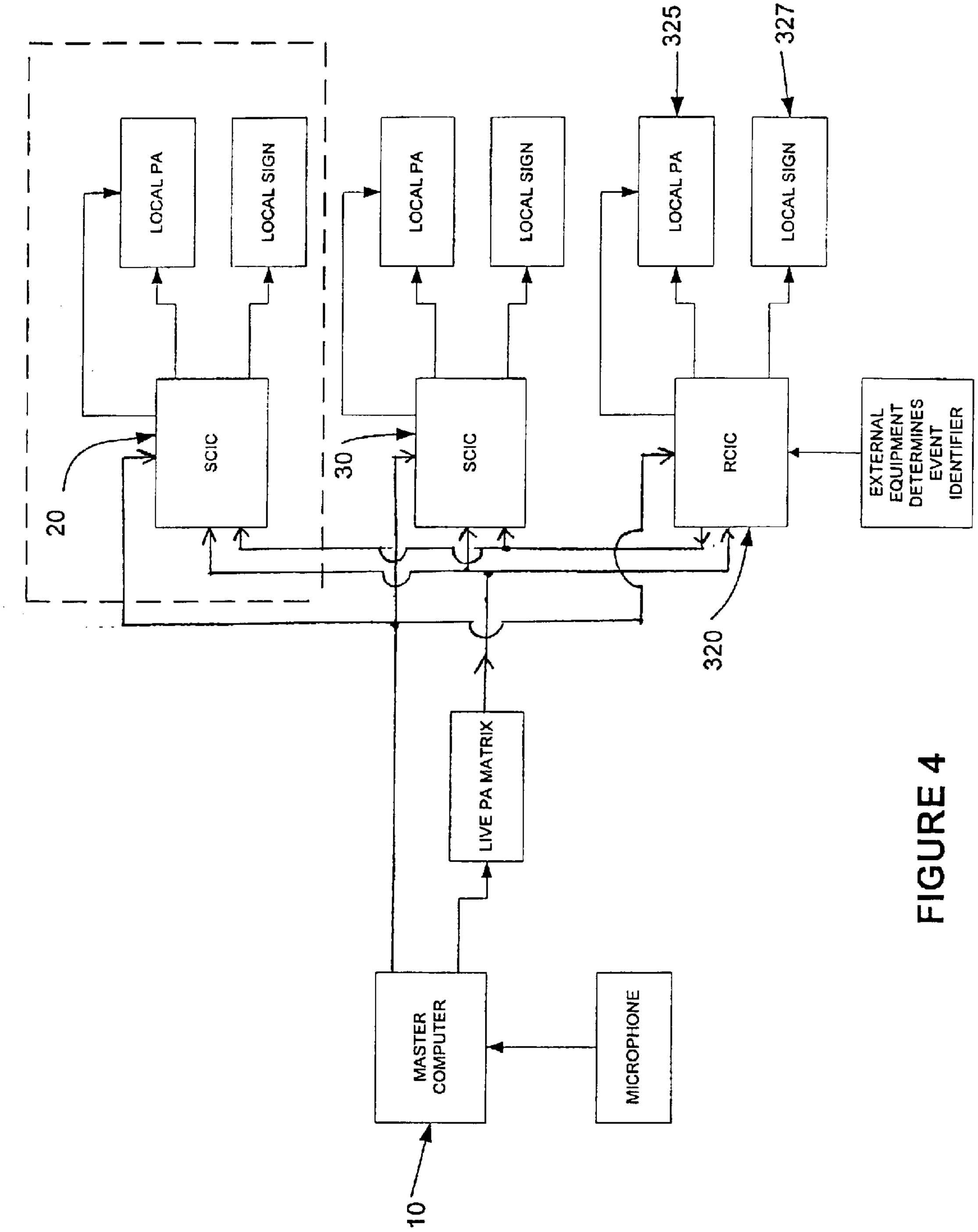
FIG. 4 is a schematic of hardware associated with the second embodiment of the subject invention.

FIG. 4 is identical to FIG. 1 with the exception of the details associated with the distribution computer (RCIC) 320. It is entirely possible for the distribution computer (RCIC) 320 to not only distribute event identifiers to the first autonomous computer 20, and the second autonomous computer 30, but it also may function as an autonomous computer with the associated local public address 325 and local sign 327.

The stored text message broadcast by each of the signs may in addition to presenting information directed to train traffic, also be used to present advertisements and such advertisements may also be broadcast in different languages, depending upon the language schedule stored within each announcement computer.

The announcement system has been discussed in relation to a rail system but it should be appreciated that the announcement system may be utilized with other transit systems, such as a bus system, where local stations may have stored pre-recorded announcements that may need to be edited or where local stations may be added or removed. In other instances, the announcement system may be utilized in a large area having many separate stations, such as an amusement park having a separate station at different attractions.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A message announcement system for broadcasting announcements at predetermined locations, wherein the system is comprised of:

a) an autonomous announcement computer at each predetermined location, wherein a plurality of event announcements and associated event announcement identifiers are stored therein and upon receipt of an event announcement command, the announcement computer broadcasts a particular announcement at the location; and b) a master computer in communication with each announcement computer for editing event announcements, wherein the master computer is capable of making live announcements through each of the announcement computers and associated public address systems.

2. The message announcement system according to claim 1 wherein the master computer is in communication with each announcement computer to edit event announcements stored in each of the announcement computers.

3. The message announcement system according to claim 2 wherein the master computer is adapted to download to the storage of at least one announcement computer new or modified event announcements.

4. The message announcement system according to claim 1 wherein the announcement computers are interchangeable modules.

5. The message announcement system according to claim 4 wherein each autonomous computer has stored therein identical event announcements and associated event announcement identifiers.

6. The message announcement system according to claim 4 wherein at least one autonomous computer has stored therein different event announcements and event associated announcement identifiers than those stored in other autonomous computers.

7. The message announcement system according to claim 1 wherein each event announcement may be comprised of one or both of text for a sign display and audio signals for a public address system.

8. The message announcement system according to claim 1 wherein each autonomous computer has stored therein identical event announcements each recorded in at least two different languages.

9. The message announcement system according to claim 1 wherein the announcement computer furthermore has stored therein a language schedule to determine in which language or languages each event announcement should be presented at different times throughout the day.

10. The message announcement system according to claim 1 further including an intermediate computer that receives a signal from external sources and determines the appropriate event announcement to forward to each announcement computer.

11. The message announcement system according to claim 1 further including at least one satellite computer attached to the master computer and capable of making live announcements and editing or adding stored announcements to each announcement computer through the master computer.

12. The message announcement system according to claim 1 wherein the predetermined locations are stations within a transit system.

13. The message announcement system according to claim 1 wherein the predetermined locations are stations within a rail system.

14. The message announcement system according to claim 1 wherein the predetermined locations are attractions within an amusement park.

15. In a message announcement system for broadcasting event announcements at predetermined locations, a method for editing and broadcasting event announcements comprising the steps of:

a) storing in an autonomous announcement computer at each predetermined location, a plurality of event announcements and associated event announcement identifiers;

b) upon the receipt of an event announcement commands broadcasting an announcement at the predetermined location;

c) editing event announcements stored at the announcement computers using a master computer in communication with each announcement computer; and d) using the master computer to make live announcements through the announcement computer and associated public address systems.

16. The method according to claim 15 wherein the step of editing is comprised of downloading to the storage of at least one announcement computer new or modified event announcements.

17. The method according to claim 15 wherein the step of storing is comprised of downloading to the announcement computers identical event announcements and associated event announcement identifiers.

18. The method according to claim 15 wherein the step of storing is comprised of downloading to at least one announcement computer different event announcements and associated event announcement identifiers than those stored in other autonomous computers.

19. The method according to claim 15 wherein the step of storing is comprised of downloading to the announcement computers event announcements comprised of one or both of text for a sign display and audio signals for a public address system.

20. The method according to claim 15 wherein the step of storing is comprised of downloading to the announcement computers a plurality of identical event announcements in one language and a duplicate set of those same event announcements in a different language.

21. The method according to claim 15 further including the step of downloading to the announcement computers a language schedule specifying in which language or languages each event announcement should be presented at different times throughout the day.

22. The method according to claim 21 wherein the step of downloading further includes instruction of the sequence for playing different languages of the same event announcement within a predetermined window of time.

* * * * *